Patented Oct. 24, 1944

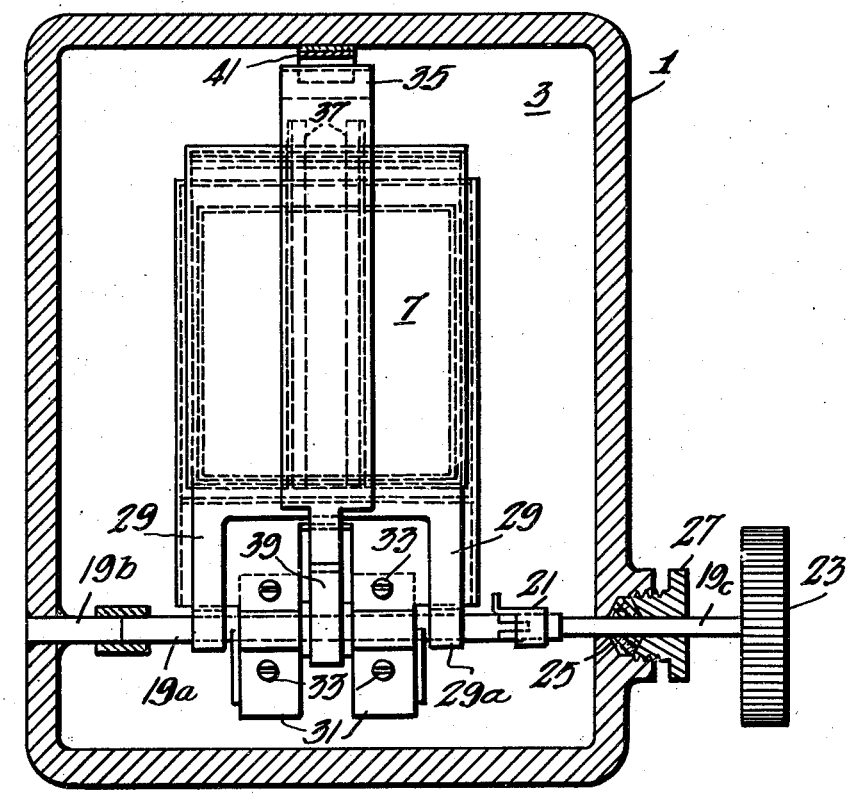
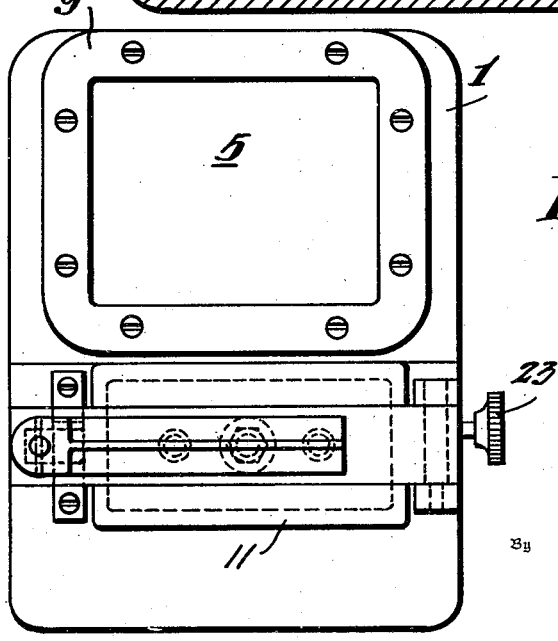

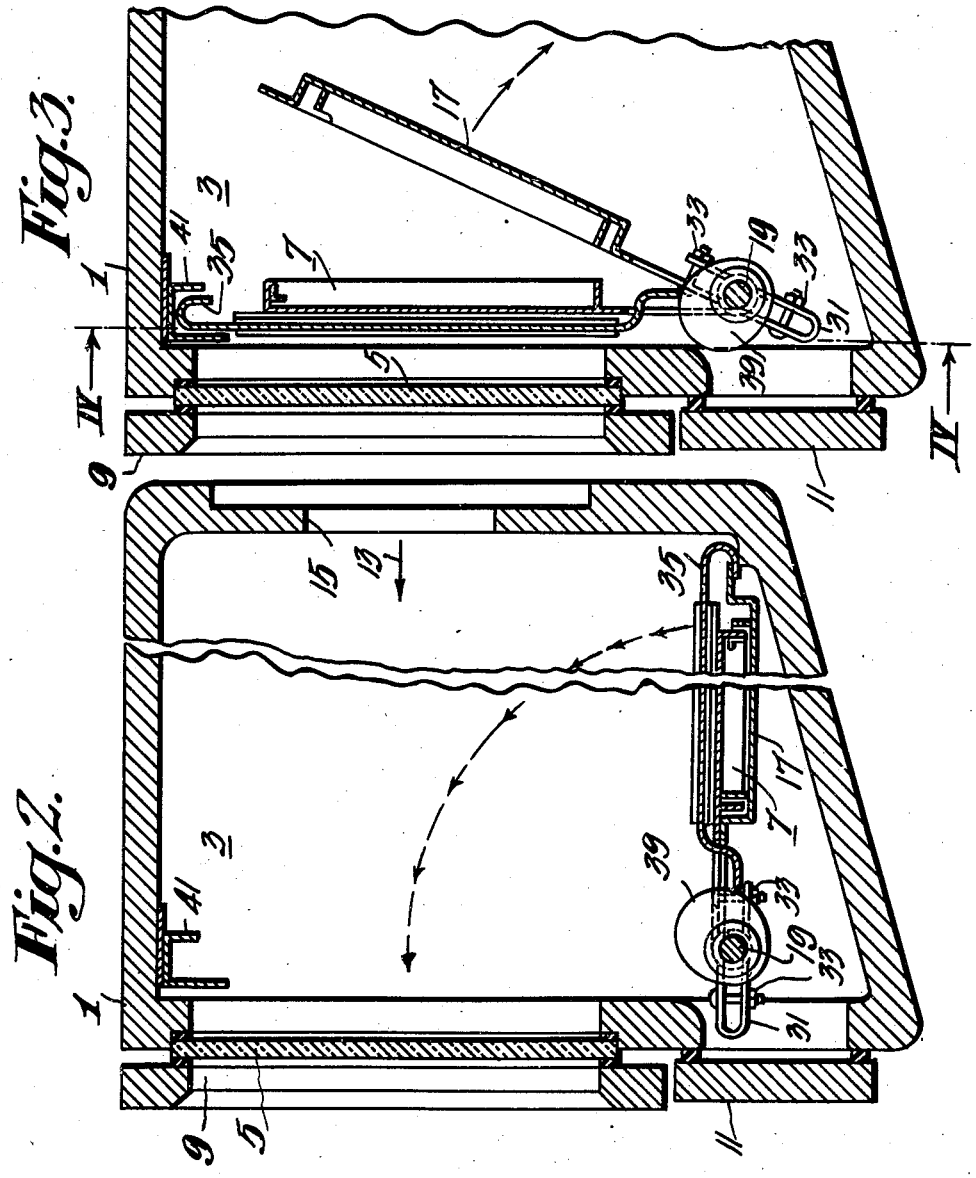

2,360,872

UNITED STATES PATENT OFFICE 2,360,872

ELECTRON OPTICAL INSTRUMENT

James Hillier, Cranbury, N. J., assignor to Radio Corporation of America, a corporation of Delaware Application September 25, 1943, Serial No. 503,774

5 Claims. (Cl. 250—68)

This invention relates to electron optical instruments, such for example as electron microscopes, diffraction cameras, telescopes, etc. and has special reference to the provision of improvements in means for photographing the electron images or diffraction patterns produced within such instruments.

In one type of electron microscope, now commercially available, the electron axis of the instrument lies in the vertical direction and the electrons travel downwardly to a viewing chamber which contains a metal plate having on its upper side a coating of willemite or other fluorescent material which converts the electron image into an optical image. The optical image may be viewed by an observer looking through an eyepiece mounted in a side wall of the instrument above the plane of the screen. Usually, the viewing screen is hinged and has a photographic plate holder or cassette therebeneath so that, when the electron image is to be photographed, the screen may be lifted to expose the photographic plate to the electrons. When the image is to be viewed directly (i. e. on the fluorescent screen) the number of observers who can view the screen at one time is of course limited to the number of eyepieces or windows which can be provided in the limited wall space available. In an effort to solve this problem it has previously been proposed to construct the viewing chamber in the form of a binnacle (as to this see copending application of C. J. Young, Ser. No. 456,597, filed August 29, 1942) but this requires a very special supporting structure capable of withstanding the (atmospheric) pressure which prevails adjacent to the transparent cover or top plate through which the fluorescent screen is viewed. Further, since in any event the screen is relatively remote from the observer the optical image thereon cannot be examined with a magnifying glass.

In another type of electron microscope, wherein the electron axis is arranged more or less horizontally, the fluorescent viewing screen is constituted of glass and comprises an end wall of the instrument. This dispenses with the necessity for auxiliary windows or eye-pieces and otherwise simplifies the construction of the instrument. Such instruments, however, as heretofore constructed, make no provision for photographing the electron image, though the fluorescent (optical) image may, of course, be photographed from the exterior of the microscope. Such photographs, however, may be affected by defects in the glass and by the long exposure time required and hence are in no wise comparable in quality to those obtained when the photographic plate or film is exposed directly to the electrons within the instrument.

Accordingly, the principal object of the present invention is to obviate the foregoing and other less apparent objections to electron optical instruments of the prior art.

Another and related object of the invention is to provide an improved electron optical instrument of the type provided with a translucent viewing screen and one wherein provision is made for photographing the electron images or patterns produced within the vacuous space intermediate the screen and the source of the electrons.

Another object of the invention is to provide an improved photographic plate holder or "cassette" for electron optical instruments of the general character described.

Another more specific object of the present invention is to provide an improved cassette having but a single external control and one which operates within the minimum exposure time to produce photographs of extremely high resolution.

Other objects and advantages will be apparent and the invention itself will be best understood by a reference to the following description and to the accompanying drawings, wherein Figure 1 is a front elevation of the viewing chamber of an electron microscope having a transmission type viewing screen and provided with a vacuum-tight door through which access may be had to the interior of said chamber.

Figures 2 and 3 are vertical sections of the viewing chamber of Figure 1 showing a cassette constructed in accordance with the principle of the invention, the direction and movement of the several parts of the cassette being indicated by broken arrows, and Figure 4 is a sectional view of the apparatus of Figures 1 to 3 taken on the line IV—IV of Figure 3 and showing the cassette in its raised position.

In the accompanying drawings, wherein like reference characters represent the same parts in all figures, I designates, generally, an electron microscope or analagous electron image device having an evacuable viewing chamber 3 provided with a fluorescent screen or window 5 and which contains a cassette 7 constructed and operated in accordance with the principle of the present invention. As shown in Figures 1 and 2, the fluorescent window 5 is mounted in a suitable escutcheon 9 at the front of the viewing chamber and there is a vacuum-tight door 11 beneath the escutcheon through which access may be had to the interior of the said chamber for the purpose of removing the cassette 7 and for placing a photographic plate therein.

As indicated by the straight arrow 13 (Fig. 2), the electron image beam enters the viewing chamber through an aperture 15 which surrounds the "optical axis" of the device and which will be understood to communicate with the lens chamber (not shown) of the microscope. This aperture 15, at the rear of the viewing chamber 1, is in register with the center of the translucent fluorescent screen 5. Hence, when the image is to be viewed directly, the beam 13 impinges the rear surface of the said screen and forms a light image thereon which is visible to an observer looking into the screen at the front of the chamber.

As will hereinafter more fully appear, the cassette of the invention is pivotedly mounted so that when the image is to be viewed directly (i. e. on the fluorescent screen 5) the cassette 7 may be swung "downwardly" out of the way of the screen and, when the image is to be photographed, swung upwardly into the path of the electron image beam 13. As shown more clearly in Fig. 3, the cassette 7 is provided with shutter 17 and an important feature of the invention resides in the provision of a single control for both (a) moving the cassette 7 into the path of the electron image and (b) operating its shutter 17 to expose the photographic plate or film therein to said image.

Both the cassette 7 and its shutter 17 are carried by a shaft 19 which extends across the viewing chamber adjacent to the vacuum-tight door 11. As shown in Fig. 4, this shaft comprises a central section 19a and two stub portions 19b and 19c to which the central part is removably affixed by a sleeve or clutch 21. The stub shaft 19c extends through a side wall of the viewing chamber and terminates in a single control knob 23. A vacuum-tight seal is maintained about the shaft 19c by means of a grommet 25, which may be constituted of synthetic rubber coated with oil of a low vapor pressure, and which is urged into intimate contact with the shaft by means of a threaded bushing 27 through which the shaft passes.

The cassette 7 terminates at its lower end in an inverted U-shape yoke 29 and is supported for rotation on the shaft 19 either by bearings or, more simply, by looping the ends of the U about the shaft, as indicated at 29a, Fig. 4. The cassette cover 17, on the other hand, is fixed on the shaft 17 by two spring clips 31 which are clamped about the shaft by means of screws 33. A latch 35 which has a sliding fit in a guideway 37 (Fig. 4) on the back of the cassette operates through its bent-over free end to hold the cover 17 in its closed position against the opposite side of the cassette as shown in Fig. 2. A cam 39 which is fixed on the shaft 19 between the spring clamps 31 serves to lift the latch 35 into engagement with a catch 41, at the top of the viewing chamber, when the cassette and its cover are moved into a position normal to the electron axis 13 of the device by turning the control knob 23; that is to say, when the cassette assembly 7—17 is raised to a position whereat the latch 35 is in register with the catch 41, continued rotation in the same direction of the shaft 19 and hence of the cam 39 will cause the cam to move the sliding latch member 35 into engagement with the catch 41.

A reverse rotation of the shaft 19 will move the cover 17 away from the cassette 7 and thereby expose the photographic plate therein to the electron image. This requires a 90° rotation and during this movement the cassette 7 is maintained in its raised position by the latch 35 which is held within the catch 41 by the cam 39. The exposure is terminated by a reverse rotation of the shaft which returns the cover or shutter 17 to its closed position. Continued rotation releases the sliding latch 35 from the catch 41 so that the whole assembly may be lowered into its initial position and removed through the door 11, whereupon the photographic plate may be removed and developed.

In conclusion, it may be pointed out that the exposure time for photographing the electron image within the viewing chamber is of the order of .01 to .001 of that employed in photographing the optional image from the exterior of the said chamber and that this greatly reduces the power supply regulation requirements (and hence the cost) of the instrument. Further, the contrast and "gamma" of photographs obtained within the instrument are superior to those obtained by photographing the optical image from a point in front of the fluorescent screen.

What is claimed is:

1. In a viewing device having an optical axis, a rotatable shaft having an axis which is offset from said optical axis, a cassette supported on said shaft, and means for moving said cassette into and out of a plane substantially normal to said optical axis.

2. In an electron optical instrument having a viewing chamber including a translucent fluorescent screen and containing an electron optical axis along which electrons travel in their journey to said screen, a cassette mounted for movement within said chamber on the side of said screen which is presented to said electrons, and means for moving said cassette into and out of the path of said electrons.

3. In a viewing chamber having an optical axis, a rotatable shaft, a cassette and a normally closed shutter therefor supported for relative movement on said shaft and movable into and out of a plane substantially normal to said optical axis, and means operative when said cassette is in said plane for opening said normally closed shutter.

4. In an electron optical instrument having an evacuable viewing chamber including a translucent fluorescent screen and containing an electron optical axis along which electrons travel in their journey to said screen, a shaft supported for rotation within said chamber along an axis substantially normal to said electron axis and offset therefrom, a cassette supported for relative movement on and with respect to said shaft, a shutter for said cassette supported on said shaft and movable with said cassette into a plane substantially parallel to said fluorescent screen, a latch mounted on said cassette and adapted to hold said shutter in its normally closed position, a catch for said latch mounted within said chamber and in register with said latch when said cassette and its cover are moved by said shaft into said plane, a cam mounted on said shaft and adapted to move said latch out of engagement with said shutter and into engagement with said catch whereby said shutter may be opened upon rotation of said shaft in the reverse direction to expose the interior of said cassette to said electrons, and means exterior of said chamber for rotating said shaft.

5. The invention as set forth in claim 4 and wherein said evacuable viewing chamber is provided with a vacuum-tight door in register with said shaft and said shaft is removably mounted whereby said shaft and the shuttered cassette thereon may be removed as a unit from said chamber.

JAMES HILLIER.